DIRECTIONAL INCLINATION RECORDING APPARATUS

Filed Jan. 9, 1951 5 Sheets-Sheet 1

INVENTORS
ARTHUR R. BARNETT
OSWALD SUTER
BY ALFRED J. ABS
Fulwider & Mattingly
Attorney Nov. 20, 1956 A. R. BARNETT ET AL 2,770,887

DIRECTIONAL INCLINATION RECORDING APPARATUS

Filed Jan. 9, 1951 5 Sheets-Sheet 2

INVENTORS
ARTHUR R. BARNETT
OSWALD SUTER
ALFRED J. ABS
BY Fulwider & Mattingly
Attorneys

DIRECTIONAL INCLINATION RECORDING APPARATUS

INVENTORS
ARTHUR R. BARNETT
OSWALD SUTER
BY ALFRED J. ABS
Fulwider & Mattingly
Attorneys Nov. 20, 1956 A. R. BARNETT ET AL 2,770,887

DIRECTIONAL INCLINATION RECORDING APPARATUS

Filed Jan. 9, 1951 5 Sheets-Sheet 4

INVENTORS
ARTHUR R. BARNETT
OSWALD SUTER
ALFRED J. ABS

BY Fulwider & Mattingly

Attorneys

DIRECTIONAL INCLINATION RECORDING APPARATUS

Filed Jan. 9, 1951

5 Sheets-Sheet 5

INVENTORS
ARTHUR R. BARNETT
OSWALD SUTER
ALFRED J. ABS
BY Fulwider & Mattingly
Attorneys United States Patent Office 2,770,887

Patented Nov. 20, 1956

2,770,887

DIRECTIONAL INCLINATION RECORDING APPARATUS

Arthur R. Barnett and Oswald Suter, Los Angeles, and Alfred J. Abs, Van Nuys, Calif., assignors to Technical Oil Tool Corporation, Ltd., Los Angeles, Calif., a corporation of California Application January 9, 1951, Serial No. 205,091

15 Claims. (Cl. 33—205.5)

Our invention relates generally to survey instruments for use in well bores, and more particularly to an improved recording instrument and reading device for determining the inclination and direction of deviation of the well bore from the vertical.

In the well drilling art it is necessary to make frequent determinations of the orientation of the well bore. When the conditions require offset or "slant" drilling, it is necessary to know the inclination of the bore relative to a true vertical axis, and the direction of the bore in azimuth. Normally, the inclination of the bore is a comparatively small angle, but under certain conditions, such as offshore drilling, this angle may become quite large. We have therefore developed two embodiments of our invention, one of which is capable of measuring angles in a range of 0° to approximately 20° with extreme accuracy, and another which measures any angle from 0° to 80° with only slightly less accuracy. The restrictions which limit the accuracy of this type of instrument are the physical dimensions which permit the convenient placement of the instrument within the well bore. In general, the diameter of the instrument housing must be somewhat less than two inches. Larger devices cannot be properly lowered within a majority of wells and consequently have little operational use.

Although many instruments have been proposed for the purpose of recording both inclination and direction, the results have been quite unsatisfactory. The mode of operation of many prior devices is such that they are not reliable or accurate under the rugged operating conditions encountered. Still other devices are complex and difficult to operate. For example, devices depending upon electrical power sources must either have a self-contained source, or a connection to the surface. Neither of these supply methods is reliable. Likewise, photographic elements are only partially successful in the high operating temperatures and pressures of a well bore.

Accordingly, it is a major object of our invention to provide an improved directional inclination recording instrument which is an entirely self-contained mechanical device and is reliable and accurate.

It is also an object of our invention to provide a recording instrument wherein there is a positive engagement between the indicating and recording means.

Another object of our invention is to provide a multiple-acting recording means which makes successive readings as a positive check on the accuracy of the device, and has indexing means to space apart the readings.

It is a further object of our invention to provide a recording instrument having a single indicating assembly coacting with the recording means to produce a simultaneous marking of inclination and azimuth on a single record member.

Yet another object of our invention is to provide a recording instrument including a "dry" compass having bearing means protected against the entry of dirt due to pressure and temperature changes, and a compass suspension which maintains a magnetic element in the horizontal plane irrespective of the inclination of the instrument.

Still another object of our invention is to provide a separate record chart for each run of the instrument, and a simple and compact reading device to measure the readings marked on the chart.

It is a still further object of our invention to provide an indicating assembly and reading device for a low angle range, and another assembly and reading device for use in a high angle range.

These and other objects and advantages of our invention will become apparent from the following detailed description of a preferred and modified form thereof, and from an inspection of the accompanying drawings, in which.

Figures 1, 2:
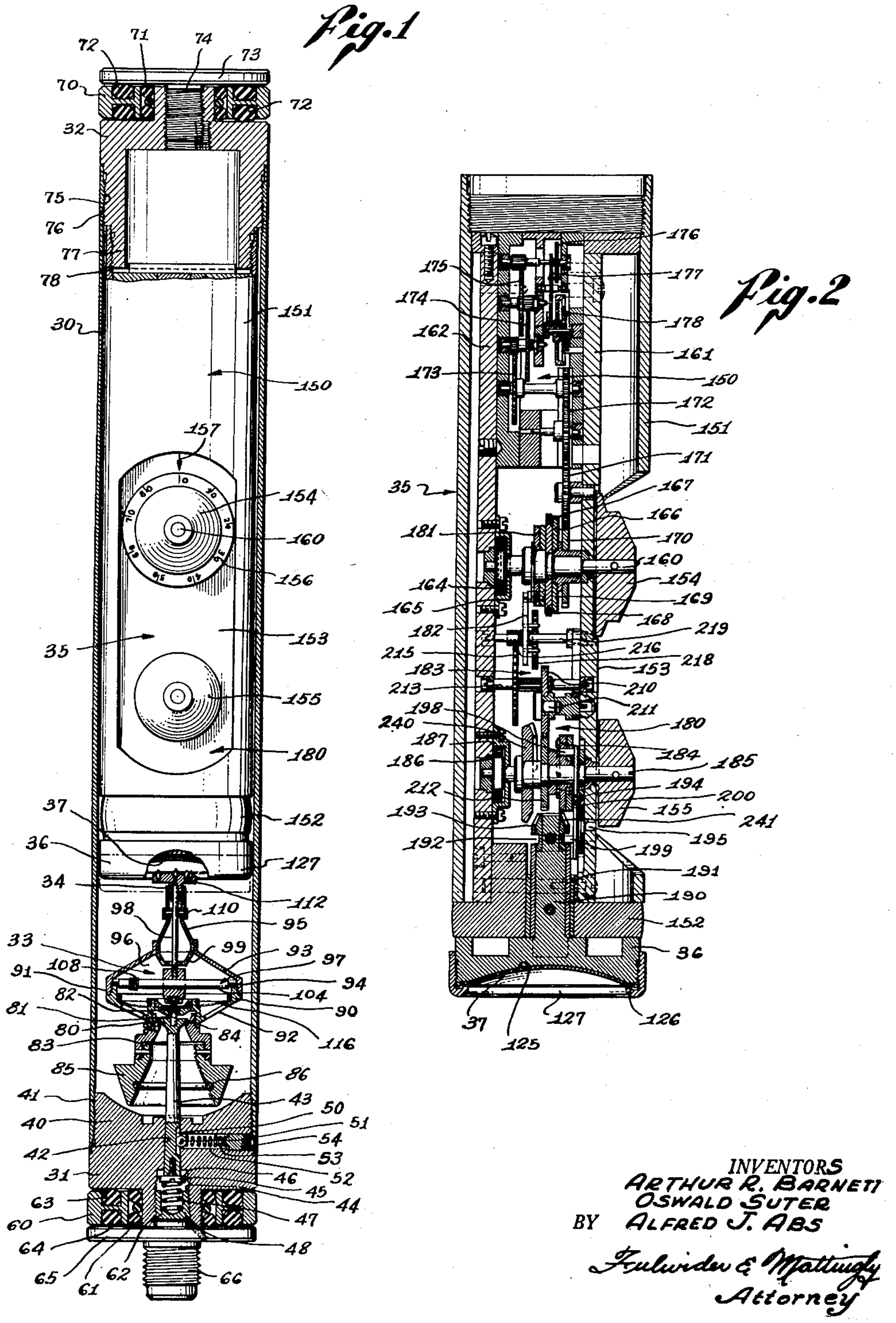
Fig. 1 is a longitudinal section of a preferred form of our directional inclination recording instrument.
Fig. 2 is an enlarged longitudinal section of the recording element taken at right angles to the view of Fig. 1.

Referring now to the drawings and particularly to Fig. 1 thereof, the numeral 30 designates an elongated tubular housing which contains the operating elements of a preferred form of our instrument. The housing 30 is closed at its lower end by a base member 31 and at its upper end by a cap member 32 which are flanged slightly outwardly to center the housing within an outer protective shell (not shown). In operation, the outer shell is dropped or lowered within a well bore to position the housing 30 in alignment with the axis of the well bore.

In the lower portion of the housing 30 is an indicating assembly 33 having a compass and pendulum means mounted for relative rotational and pivotal movement as the housing is inclined in accordance with the direction of the well bore. The indicating assembly 33 has an upper indicating head 34 which is maintained in an upstanding vertical position and oriented in the direction of a North-seeking compass means. The indicating head 34 is thus offset from the axis of the housing 30 an amount which is proportional to the angular inclination of the well bore from the vertical, and is rotated in azimuth to the direction of the magnetic North Pole. As will be explained in connection with the chart reading device, it is then possible to quickly measure the azimuthal direction of the well bore.

Suspended above the indicating assembly 33 is a recording means or element 35 which controls the sliding movement of a chart holder 36 mounted on the lower end thereof. The chart holder 36 carries a concave circular chart 37 in coaxial alignment with the housing 30 and normally spaced above the indicating assembly 33. The recording element 35 releases the chart holder 36 at predetermined time intervals, and the latter carries the chart 37 into engagement with the indicating head 34, and then returns to its normal position. During each cycle of operation a group of marks is made on the chart 37 which provides a record of the inclination and direction of azimuth of the well bore. As will later be described, the chart holder 36 is rotated or indexed between cycles so as to separate and space apart the readings made on the chart 37.

The base member 31 closes the housing 30 and supports the indicating assembly 33 centrally therein. Preferably, the base 31 has an upper threaded hub 40 to engage and seal firmly with internal threads 41 on the housing 30. A central bore 42 is formed in the base 31 to slidably contain a rod or stem 43 which extends upwardly and supports the indicating assembly 33. The lower portion of the base 31 has an enlarged threaded opening 44 terminating in a short cylindrical section 45. An enlarged head 46 is formed on the lower end of the stem 43 to fit slidably within the cylinder 45, and a spring 47 urges the stem resiliently upwardly. The outer end of the spring 47 is confined by an adjustable screw 48 seated in the opening 44. The stem 43 is thus yieldably supported to cushion the indicating assembly 33.

On the lower portion of the stem 43 is a peripheral eccentric groove 50 which engages with a spring detent means 51 to resist relative rotation. The detent means 51 may be formed as a ball confined within a transverse bore 52 cut into the base 31, and is urged inwardly by a spring 53 and adjustment screw 54. The ball 51 is pressed firmly against the wall of the groove 50, and the latter is of substantial width so as to remain in frictional contact during any longitudinal movement of the stem 43.

The lower end of the base 31 is preferably built up to provide a resiliently mounted flange 60 which projects outwardly to absorb lateral shocks which would otherwise be transmitted to the housing 30. Such a flange is similar to the construction described in the copending application of Oswald Suter, et al., Serial No. 184,876, filed September 14, 1950. A plurality of resilient rings 61 surround a central hub 62 and support the flange 60. Annular grooves 63 are formed in the upper and lower faces of the flange 60 to confine resilient rings 64 which prevent free rotation of the flange 60. A plate-like cover 65 extends outwardly below the flange 60 and supports a central stud 66 for connection with a shock-absorbing unit.

The cap member 32 is built up similarly to the base member 31 and provides an outer resiliently mounted flange 70. The flange 70 is held outwardly by a plurality of resilient rings 71 and is prevented from rotating freely by upper and lower friction rings 72. A removable cover plate 73 bears against the upper ring 72 and prevents axial movement of the flange 70. On the bottom of the plate 73 is a threaded stud 74 which is screwed into the cap 32. The lower portion of the cap 32 is threaded externally at 75 to engage and seal with threads 76 formed in the housing 30. To support the upper end of the recording element 35 a reduced threaded stud 77 is formed to engage with a sleeve 78 extending upwardly from the recording element. The cap 32 and recording element 35 are thus removable as a unit from the housing 30 for setting of the recording mechanism prior to the operation of the device.

Returning to the interior of the housing 30, it will be seen that the upper end of the supporting stem 43 terminates in a semi-spherical head or ball 80. On the top face of the ball 80 is a projecting pivot pin 81 which pivotally supports the indicating assembly 33. A central bearing ring 82 overhangs the pin 81 and extends outwardly to join the body or housing of the indicating assembly as will later be described. Depending from the ring 82 is an outwardly flanged socket member 83 that is provided with an upwardly facing socket or seat 84 which surrounds the ball 80. The ball 80 and socket 84 normally have a slight clearance so that the assembly 33 is freely supported by the pin 81 without appreciable friction. When a jar or shock is received by the instrument, the ball 80 and socket 84 may momentarily engage to prevent the bearing ring 82 from being lifted away from the pin 81.

Surrounding the stem 43 is a weighted dependent skirt 85 which joins the socket member 83. The skirt 85 pivots relative to stem 43 to maintain the indicating assembly 33 in an upstanding vertical position. On the inner edge of skirt 85 is a resilient buffer ring 86 adapted to engage stem 43 when the limit of pivotal movement of the skirt is reached. The buffer ring 86 cushions the stem 43 from damage due to excessive oscillation of skirt 84. In this form of the device, the indicating assembly 33 is designed to give very accurate measurements of inclination in the low angle range, from 0° to approximately 20°. The inclination range of the device may be modified substantially, but is operationally limited by the diameter of the housing 30 which must be relatively small.

The indicating assembly 33 carries the previously mentoined indicating or marker head 34 which is inclined from the axis of the housing 30 and is rotated in azimuth to the direction of magnetic north. The construction of the indicating assembly 33 and mounting of the head 34 may thus be seen in Figs. 3 and 4. A lower body member or circular shell 90 is joined integrally to the bearing ring 82 and extends upwardly and outwardly to a circular threaded upper rim 91. A plurality of vent openings 92 are spaced about the surface of the shell 90 and provides breathing ports for the interior thereof. A similar inverted upper body or upper cover 93 has a lower threaded rim 94 which is removably engaged with the rim 91. The cover 93 tapers upwardly to a neck or sleeve 95 which rotatably supports the indicating head 34. The body 90—93 thus provides an inner circular compass chamber 96 which is closed except for the lower vents 92 and a small upper opening in the neck 95. Rotatably mounted within the chamber 96 is a magnetic compass element 97 having a shaft 98 extending upwardly and connected to the indicating head 34. The head 34 is rotated by the shaft 98 and is oriented in azimuth to the direction assumed by the compass element 97. A spider or perforated brace 99 may extend across the base of the neck 95 and form a spaced ring surrounding the shaft 98. The brace 99 prevents bending of the shaft 98 under heavy load or shock.

Because of the small rotational torque exerted by the compass element 97 a substantially frictionless bearing support must be provided for the compass element and the connected indicating head 34. In order to maintain the compass support in such a delicately balanced condition, it is necessary that the bearings therein be kept absolutely free from dust or dirt particles. This has been a major difficulty encountered with all previous "dry" compass bearings. Upon temperature and pressure changes within the instrument, particles of dust are carried by moving air currents and tend to settle in the restricted bearing surfaces. If this condition obtains, the orientation of the compass element 97 may deviate considerably from the magnetic north, and the utility of the device is greatly impaired. We have overcome the difficulties of a dry bearing suspension by providing compass bearings which are delicately balanced and will not collect dust or dirt on the bearing surfaces.

In order that the available magnetic torque need not be utilized in rotating the entire indicating assembly 33, the compass element 97 and indicating head 34 are independently rotatable within the body 90—93. The bearing ring 82 has a central replaceable bearing block 100 which is held in place by a downwardly seated lock ring 101. The block 100 has a lower concave center which seats on the tip of the pivot pin 81 to suspend the indicating assembly 33 for inclination relative to the stem 43. Projecting upwardly from the bearing block 100 is a second or compass pivot pin 102 which rotatably supports the compass element 97. A rectangular holder 103 and horizontal bar magnet 104 form the compass element 97. In the bottom of the holder 103 is a bore 105 carrying a miniature ball bearing 106. The cone of pivot 102 engages a set of balls 107 to support the holder 103. This form of bearing support has negligible friction and allows free rotation of the compass element 97.

A major advantage results from mounting the compass element 97 within the indicating assembly 33 as the magnet 104 will be maintained in the true horizontal plane irrespective of the inclination of the well bore. A small counterweight 108 is adjustably fitted around the south-seeking end of the magnet 104 to compensate for the local dip of the magneticflux lines. So corrected, the magnet 104 exerts no inclining force on the indicating assembly 33 which stands in the true vertical under the gravitational pull on the pendulum skirt 85. Since the compass element 97 is always in the horizontal plane, the magnetic torque will be uniform and will not vary with the inclination of a particular well bore. This results in more accurate readings of azimuth and greatly increases the utility of the device.

The shaft 98 connecting the compass element 97 with the indicating head 34 is supported at its upper end by an annular jeweled bearing 110 mounted in the neck 95. Secured to the end of shaft 98 is a collar 111 which is threaded into the indicating head 34. Also threaded into head 34 is an upper laterally extending marking element or arm 112 as may thus be seen in Fig. 4. The head 34 is spaced slightly above neck 95 and has a lower dependent flange 113 which is spaced outwardly therefrom. A small circular chamber 114 is thus formed within the flange 113 and above the bearing 110. The clearance between the neck 95 and flange 113 provides an annular passageway 115 which vents chamber 114.

The chamber 114 and passageway 115 bear a definite relationship to chamber 96 and lower vents 92. In order to fully understand this relationship, it is necessary to consider briefly the conditions under which the instrument is used. Within the well bore the pressure and temperature may be substantially greater than under-surface conditions. For example, the temperature is quite often between 200° and 300° F. and the pressure and temperature of the air within the instrument case 30 will accordingly be raised through the heat conduction of the outer wall. The heat transfer will not necessarily be uniform and convection currents will be set up within the instrument housing. Subsequently, the temperature of the air within the indicating assembly 33 will be changed and air currents will move through the lower vents 92. So long as the air entering or leaving the compass chamber 96 passes through vents 92, there will be no tendency to deposit dust particles on the upper bearing 110. If, however, air should be forced into or out of chamber 96 by way of the neck 95, upper chamber 114 and passageway 115, we have found that there will be a gradual accumulation of dirt on the bearing 10. This deposit creates friction which prevents the indicating head 34 from assuming the proper orientation.

To prevent this condition, we have made the cross-sectional area of the passageway 115 in the same proportion to the volume of the chamber 114, as the cross-sectional area of the vents 92 bears to the compass chamber 96. Thus, upon a temperature or pressure change within the instrument, there will be no tendency to create a pressure differential between the chamber 114 and the chamber 96, since these chambers have similarly restricted communication with the air within the instrument housing. By maintaining this balanced pressure condition across the upper bearing 110, we prevent the accumulation of dirt therein and insure accurate positioning of indicating head 34. As a further precaution against the entry of dirt into the compass bearings, we provide a fine mesh screen 116 which extends across the lower shell 90 slightly above vents 92. This screen collects any large particles of dirt which might otherwise enter chamber 96.

The marking element or arm 112 has a lower stem securely fastened to the indicating head 34 and is positioned to extend outwardly parallel to compass magnet 104. The upper surface of arm 112 is of convex curvature lying on an arc centered at the tip of pivot pin 81. The previously mentioned chart or record 37 is supported above the marking element 112 and has a similar radius of curvature. On the surface of arm 112 are marking means which are adapted to engage and impress into the material of the chart 37 a particular pattern or "indicia group" which records both the angular inclination of the well bore from the vertical and the orientation in azimuth of such inclination.

The marking means comprise a central pin 120 projecting upwardly from the surface of the arm 112, and a pair of end or azimuth pins 121 and 122. The central pin 120 is in exact alignment with the longitudinal axis of the indicating assembly 33 and is therefore pivotally displaced or offset from the center of chart 37 an angular amount which is proportional to the relative inclination of the well bore from the vertical. The azimuth pins 121 and 122 are in alignment with the North and South ends, respectively, of the compass magnet 104 to record simultaneously with the inclination recording, the relative orientation or direction of the magnetic North Pole. In order that the North-seeking end of the compass magnet 104 may be distinguished from the opposite or South-seeking end, two closely spaced marking pins 121 are placed at the corresponding end of the arm 112. Thus the indicia group recorded on the chart 37 consists of a linear set of four dots or impressions which indicate both inclination and direction in azimuth. We have constructed the arm 112 with an azimuth pin 122 corresponding to the South-seeking Pole of the magnet 104, in addition to the closely spaced azimuth pins 121 corresponding to the North-seeking Pole. This is done in order that the arm 112 will not exert a twisting or bending force on the compass bearings as the pins 120—121 impress into the chart 37. It should be pointed out, however, that the pin 122 corresponding to the South-seeking Pole may be eliminated and the remaining three marking pins will be sufficient to create an indicia group indicating the direction in azimuth.

At predetermined time intervals the chart 37 is moved downwardly by holder 36 to engage with the marking pins 120—121. The chart 37, as may best be seen in Figs. 1 and 2, is preferably made of paper or soft metal and is held firmly against a concave seat 125 formed on the bottom of the chart holder 36. Surrounding the seat 125 is a raised shoulder or flange 126 which registers with the circumference of the chart to positively center the chart 37 therein. A threaded retaining ring 127 fits over holder 36 and bears against flange 126 to prevent slippage of the chart 37.

The recording means 35 includes a timing means 150 in its upper portion, and operating means 180 in its lower portion which cooperate to reciprocate the chart holder 36 into and out of engagement with the indicating assembly 33. The timing means 150 controls the release of the operating means 180 and has set therein a predetermined time interval. During the elapse of the chosen interval, the instrument is lowered to the desired position within the well bore. Upon release by the timing means 150, the operating means 180 makes two complete cycles or reciprocations during an operating interval of approximately one minute. During each cycle or reciprocation the chart holder 36 is driven rapidly into engagement with the indicating assembly 33 and slowly withdrawn. Each engagement causes a series of marks or indicia group to be made on chart 37, and the result is thus separate indicia groups recorded at closely spaced time intervals. Each indicia group indicates both angular deviation from the vertical and orientation in azimuth, and the separate recordings are compared to check on the accuracy of the instrument.

Prior to the engagement of the chart 37 with angle marker 33 in the second cycle, the operating means 180 rotates or indexes chart holder 36 about the axis of the housing 30 so that the second indicia group is circumferentially spaced from the first, but should give exactly the same measurement when read in the chart reading device later to be described. If the indicating assembly 33 remained at rest during both operating cycles, the reading of the indicia groups will be identical. If the readings are not identical, an error is indicated that was caused either by an oscillation of indicating assembly 33, or by a damaged suspension thereof. In this event a re-run of the instrument is made and the erroneous marks are not used in further calculations.

As seen in Figs. 1 and 2, the recording element 35 is preferably formed with a generally cylindrical case 151 joined to the threaded sleeve 78 for support within the instrument housing 30. The lower end of case 151 is connected to a disk or flange 152 which slidably supports chart holder 36. The flange 152 bears against the wall of the housing 30 to exactly center the case 151 therein. Extending longitudinally along the front face of case 151 is a recessed portion which exposes a flat panel 153. The panel 153 supports an upper winding or setting knob 154 for controlling the timing means 150. Spaced below knob 154 is a similar knob 155 connected to the operating means 180, as will later be described. The timing knob 154 carries a series of radial graduations 156 calibrated in minutes through an interval of approximately eighty minutes. The desired time interval is set into the timing means 150 by rotating knob 154 counterclockwise, as viewed in Fig. 1. The graduation 156 is brought opposite a fixed index mark 157 on the panel 153 to cause an equal angular rotation of a transverse main setting shaft 160 to which the knob 154 is affixed.

Mounted within the case 151 is a front frame or plate 161, the outer face of which forms the panel 153, and a back plate 162 to provide a rigid framework for supporting the timing means 150 and operating means 180. As is best seen in Fig. 2, plates 161 and 162 are spaced apart and provided with parallel interior surfaces which define an elongated rectangular chamber. The setting shaft 160 extends transversely through frames 161 and 162 and is rotatably journaled therein. Encircling the rear portion of shaft 160 is a coiled main spring 164 which is confined within a cover or housing 165 mounted on the plate 162. One end of spring 164 is secured to shaft 160 and the other end is suitably connected to plate 162 so that it is tensioned or wound by rotation of the shaft. The knob 154 is turned in a counterclockwise direction, as viewed in Fig. 1, for winding spring 164 which immediately commences to drive shaft 160 in the opposite or clockwise direction back to the initial position.

Figures 3, 4, 5, 6, 7, 8:
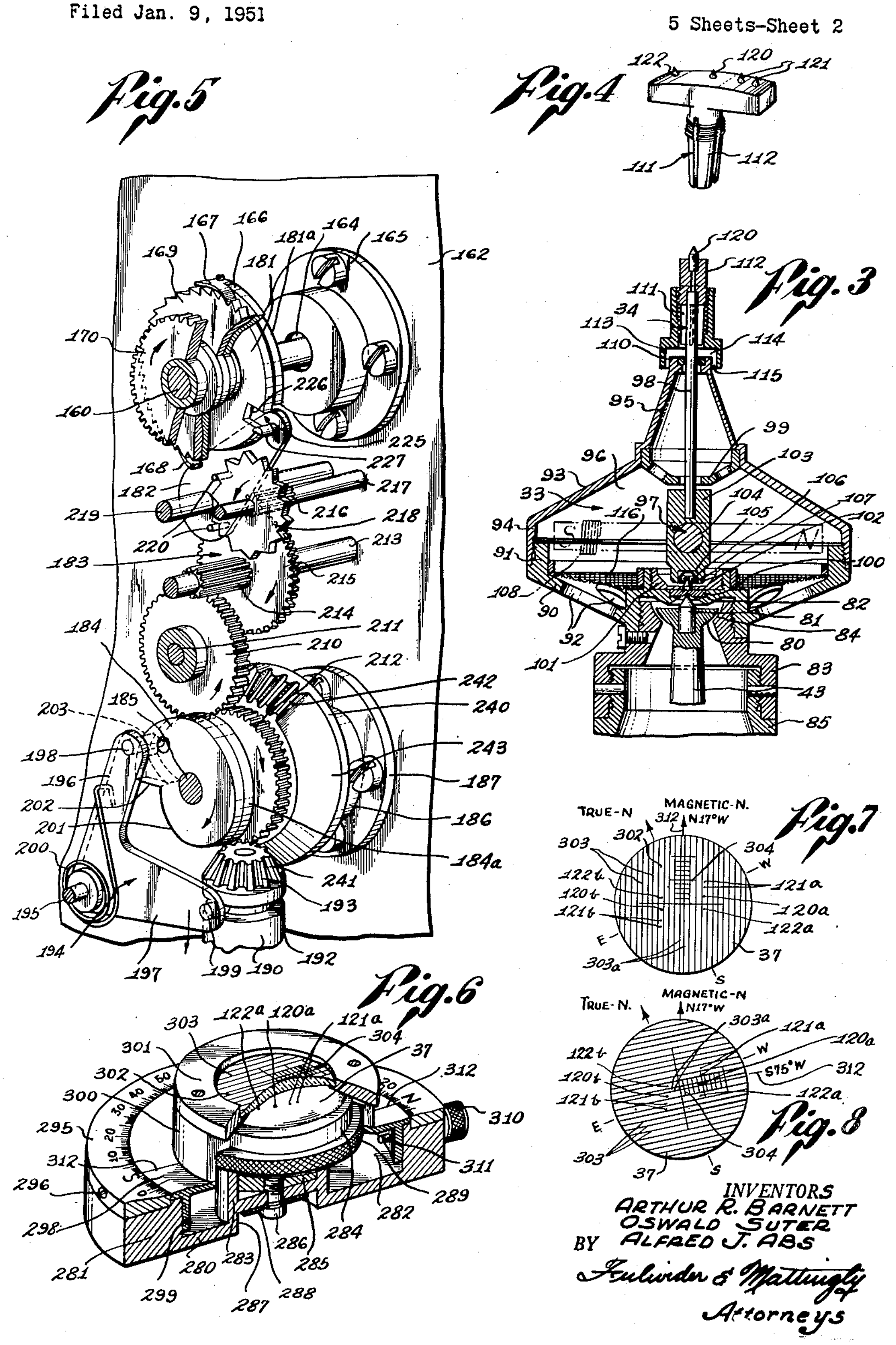
Fig. 3 is an enlarged longitudinal section of the indicating assembly taken at right angles to the view of Fig. 1.
Fig. 4 is a perspective detail of the indicating head.
Fig. 5 is a fragmentary perspective view of the operating mechanism.
Fig. 6 is a perspective view partly in section of a preferred form of chart reading device.
Figs. 7 and 8 are schematic diagrams showing the marking on the chart relative to the chart reading glass.

A ratchet clutch 166 is mounted on shaft 160 for engagement with a timing escapement during the unwinding of spring 164 to regulate rotational movement of the shaft back to the zero position. The clutch 166 is formed as a disk with a pair of overhanging spring pawls 167 and 168 mounted on the periphery thereof to engage with a ratchet toothed gear 169, as is best seen in the detail of Fig. 5. During setting, when shaft 160 is rotated counterclockwise to wind spring 164, the pawls 167 and 168 slide over gear 169 and no motion is transmitted to the escapement.

The timing means 150 may be of conventional design, and the form used herein is generally similar to the type disclosed in the aforementioned application of Oswald Suter, et al. Said timing means 150 includes a gear 170 which is mounted for rotation with the clutch gear 169 and is engaged with an upper set of multiplication gears 171, 172, 173, 174, 175 as is seen in Fig. 2. A conventional escapement wheel 176 is connected to the gear 175 and engages through a lever arm 177 with a balance wheel 178 for controlling the oscillating period. Thus, the timing means 150 controls the rotation of the clutch gear 169 to retard the unwinding rotation of the shaft 160. Because of a new cooperative engagement with the operating means 180, as will be hereinafter described, the timing means 150 may be regulated more accurately than in prior devices.

Rotation of shaft 160 under the urging of the spring 164 causes rotation of a generally circular timing cam 181 which forms the first element of the operating means 180. The cam 181 is mounted on shaft 160 and is connected to the rear face of clutch disk 166 for rotation therewith. As shaft 160 returns to the initial or zero position, the cam 181 rotates to a position permitting oscillating movement of an escapement lever 182 riding thereon. The escapement lever 182 is a part of a control escapement 183 which regulates the operating means 180 so that the cycles of operation are spaced over an appreciable time interval.

The control escapement 183 is positioned between the timing cam 181 and the lower operating cam 184 which is mounted on a transverse shaft 185 for rotation therewith. The frame plates 161 and 162 journal shaft 185 which extends outwardly through the forward frame plate and connects with the previously mentioned lower winding knob 155. Affixed to the rear end of drive shaft 185 is a coil spring 186 which is confined within a cover 187 mounted on the rear plate 162. Rotation of knob 155 counterclockwise, as viewed in Fig. 1, causes shaft 185 to rotate and wind spring 186. The knob 155 is turned through two full revolutions, at which time shaft 185 engages a positive stop and further rotation is impossible.

After shaft 185 is fully wound, it becomes engaged with the control escapement 183 which regulates the reverse rotation of the shaft under the urging of spring 186. Upon the elapse of a predetermined time interval set into the timing means 150, the timing cam 181 is rotated to a position which allows escapement lever 182 freedom to oscillate. As this happens, the control escapement 183 permits drive shaft 185 to commence rotating at a regulated and relatively slow rate to drive the operating cam 184 through two complete cycles of revolutions.

During each revolution of operating cam 184, the chart holder 36 is driven rapidly into engagement with the indicating assembly 33 and is slowly withdrawn therefrom. As can best be seen in Fig. 2, the chart holder 36 is formed with a stem 190 extending upwardly from an enlarged circular body portion holding the chart 37. The stem 190 is slidably and rotatably mounted in a journal or a sleeve 191 which is fitted within the flange member 152. Near the top of stem 190 is a cylindrical drive groove 192 formed below a toothed indexing head 193. The operating cam 184 is spaced slightly above and to the side of head 193 and is engaged with a pivoted bell crank 194. Upon rotation of the cam 184, the bell crank 194 is pivoted to drive stem 190 with a reciprocating motion along the axis of the recording element.

As is best seen in Fig. 5, the bell crank 194 is mounted on a pivot shaft 195 and has an upper lever arm 196 disposed generally perpendicular to a lower lever arm 197. The upper lever arm 196 carries a cam follower pin 198 which rides on the edge of operating cam 184 while the lower arm 197 carries a stem driving pin 199. The drive pin 199 extends laterally and is rotatably locked into the stem drive groove 192. A coil spring means 200 encircles the shaft 195 and is connected to urge downward pivotal movement of bell crank 194 in the direction indicated by the arrow of Fig. 5. The cam follower pin 198 is therefore forced inwardly against the periphery of cam 184.

The periphery of cam 184 has a spiral rise or lift surface 201 ending in a fall or radial surface 202. Upon rotation of the cam 184, the cam follower 198 rides slowly outwardly on the lift surface 201 until the fall 202 is reached. The follower 198 is cylindrical with the outer end cut to provide a plane surface 203 parallel to the fall 202, and as the parallel surfaces come into alignment, the cam follower drops abruptly inwardly to pivot bell crank 194 downwardly. The stem 190 is driven rapidly downwardly under the urging of spring 200 and forces chart holder 36 into engagement with the indicating assembly 33. As cam 184 continues to rotate, the follower 198 rides on spiral surface 201 to lift chart holder 36 slowly upwardly to the initial position. During the second revolution of cam 184, chart holder 36 will be driven through a second cycle of engagement and withdrawal from indicating assembly 33 to impress a second indicia group or record on the chart 37. A time interval on the order of twenty to thirty seconds elapses during a single revolution of the cam 184, and the second marking of chart 37 will occur a corresponding time after the first marking. Should any oscillation of indicating assembly 33 be caused by the first engagement with chart 37, such oscillation will have ceased by the time of the second marking, so that both records will be equally accurate and should give identical readings upon comparison.

The control escapement 183, as is best seen in Fig. 5, has an escapement gear train connected between the lever 182 and shaft 185 in such a way that the rotation of the latter is regulated in accordance with the frequency of oscillation of the lever. A lower spur gear 210 is mounted on a shaft 211 and is engageable with a spur gear 212 secured on the shaft 185. An intermediate shaft 213 carries a forward pinion 214 meshed with the gear 210 and a rear spur gear 215 which is meshed with an upper pinion 216. The pinion 216 is mounted on an upper shaft 217 which also carries a ratchet toothed escapement wheel 218. The escapement lever 182 is pivotally mounted on a shaft 219 and carries a pair of spaced pins or pallets 220 which are engaged with the escapement wheel 218. The pallets 220 regulate the rotation of the wheel 218 in response to the oscillation of the lever 182 in the conventional manner.

On the upper end of the lever 182 is a follower pin 225 which rides on the periphery of the timing cam 181. While the follower 225 is engaged with the surface of cam 181, lever 182 is held from oscillating on the shaft 219. The pallets 220 lock with the escapement wheel 218 to prevent rotation thereof, and the entire escapement 183 is locked to prevent rotation of the lower shaft 185. Upon elapse of the predetermined timing interval set into the instrument, timing cam 181 rotates back from the set position to the initial or zero position. At this time a large notch 226 cut into the cam 181 comes into alignment with the follower 225. The follower may then rock in and out of the notch 226 as indicated by the arrows of Fig. 5, to permit oscillation of the escapement lever 182. The lower operating cam 184 then commences to rotate under the regulated urging of the spring 186, and completes the double operating cycle.

In order that the exact time of release can be calculated, the cam notch 226 is formed to abruptly release the cam follower 225. The notch 226 is a rectangular opening and has steep radial edges or sides. The cam follower 225 is a cylindrical pin which extends outwardly from the escapement lever 182, and that portion of the pin in alignment with the edge of cam 181 is cut as a plane surface 227 which lies parallel to the leading edge of notch 226. Thus as the surface 227 comes into alignment with the edge of notch 226, there is an abrupt release of the escapement lever 182.

As can be understood, the operating means 180 is positively locked until control escapement 183 is released from the timing cam 181. The stem drive pin 199 is at all tims locked in drive groove 192 and there is no possibility that chart 37 may accidentally engage with the indicating assembly 33. The escapement lever 182 bears very lightly on the periphery of timing cam 181 during the elapse of the timing interval because of the large reduction ratio of the escapement gear train. In other words, the lever 182 is able to restrain the relatively strong shaft drive spring 186 with only a light pressure on cam 181. This is of substantial advantage in achieving an exactly correct timing interval since any substantial retardation of cam 181 tends to interfere with the regulation of timing means 150.

Figure 13:
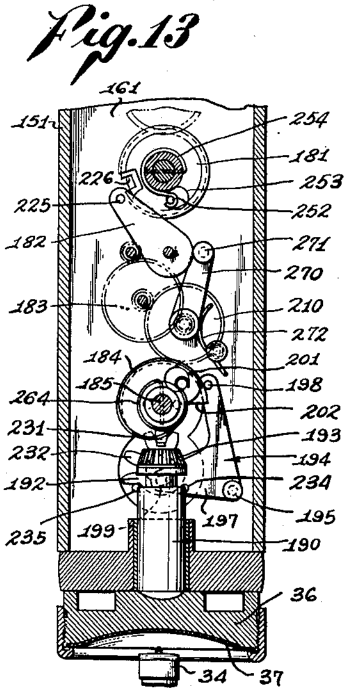
Figs. 13, 14 and 15 are partial sectional views of the lower portion of the recording element showing the details of the release and stop means in initial intermediate and final positions.
Figure 14:
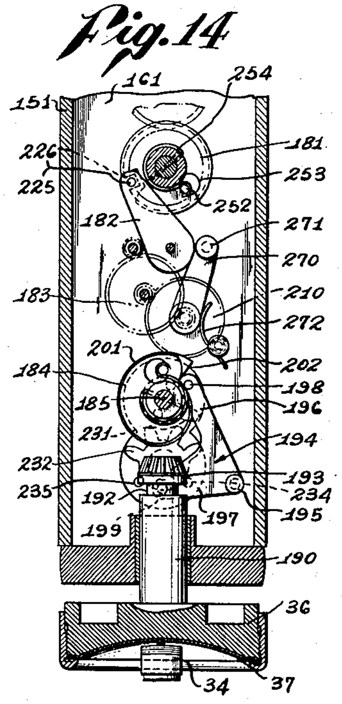
Figure 15:
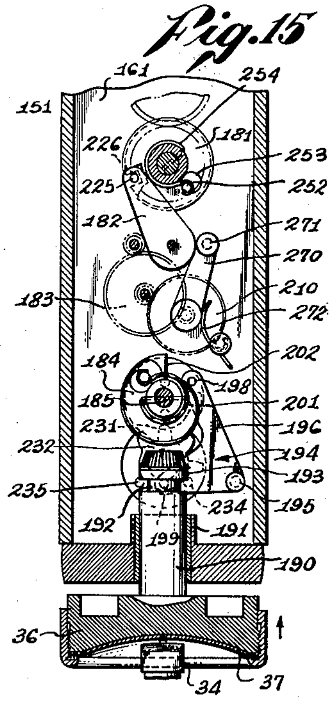

The cycles of the operating means 180 may best be followed in Figs. 13, 14 and 15. It will be remembered that timing cam 181 is rotated uniformly back to the initial position by the timing means 150. In Fig. 13 timing cam 181 is shown rotated to a position just short of the zero position, with follower 225 spaced slightly from notch 226. The control escapement 183 is locked and the lower operating cam 184 is held from rotation with bell crank follower 198 riding on the periphery thereof. In this position the bell crank 194 is held upwardly and chart holder 36 is spaced above indicating head 34.

When timing cam 181 reaches the position shown in Fig. 14, the follower surface 227 aligns with notch 226 and control escapement 183 is freed to regulated the rotation of lower shaft 185 through the oscillation of escapement lever 182. The operating cam 184 commences rotating and the follower 198 drops over cam fall 202, pivoting the bell crank 194 inwardly under the urging of spring 200. The stem 190 is driven downwardly through the connection of drive pin 199 and groove 192, and the chart holder 36 is moved downwardly to engage chart 37 with indicating head 34. The cam follower 198 rides slowly up the cam rise 201 to lift chart holder 35 to the initial position and the first cycle of operation is completed.

The second cycle of operation closely parallels the first with operating cam 184 continuing to slowly rotate. In Fig. 15 the follower 198 is shown having overriden the cam fall 202 for the second time, and is being raised by the cam rise 201. In this position chart holder 36 is moving upwardly and has partially completed the return stroke.

Figure 9:
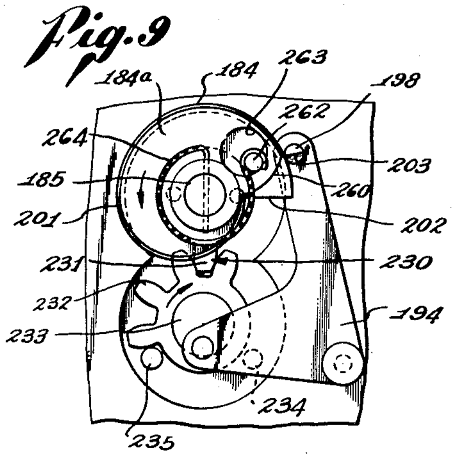
Figs. 9 and 10 are details of the release cam and drive crank.
Figure 10:
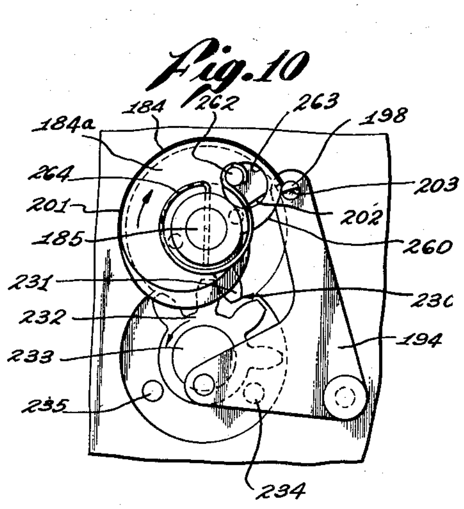

To prevent more than two cycles of the operating means 180 a positive stop means 230 is connected to the shaft 185. The stop means 230 permits exactly two revolutions of shaft 185 from the wound to unwound position of spring 186. Conversely, the stop means 230 prevents overwinding of spring 186. As is best seen in Figs. 9 and 10, a single toothed gear or lever 231 is mounted on shaft 185 rearwardly of the operating cam 184. Below stop lever 231 is a sector gear 232 pivotally mounted on a shaft 233. Pivotal movement of sector gear 232 is limited by a pair of spaced stop members or pins 234 and 235 which are adapted to abut the terminal teeth of the sector gear to limit rotation in either direction.

A complete revolution of lever 231 moves sector gear 232 through an arc equivalent to the spacing of adjacent teeth. Therefore during the two revolutions of the shaft 185 in the operating cycles, sector gear 232 moves through an arc equal to the spacing of two teeth and must have exactly that amount of end clearance with pins 234 and 235. Figs. 13, 14 and 15 show the position of the stop means 230 corresponding to the wound, intermediate and unwound positions of the spring 186. In Fig. 13 the sector gear 232 has been pivoted counterclockwise into a wound position abutting stop pin 235. Since sector gear 232 cannot override pin 235, further clockwise rotation of stop lever 231 secured to shaft 185 is prevented.

After shaft 185 has completed the first revolution, the stop lever 231 has engaged sector gear 232 and moved the same to the position shown in Fig. 14. In Fig. 15 a second revolution of shaft 185 is about to be completed, and the sector gear 232 has moved almost into engagement with stop pin 234 to prevent further rotation. The stop means 230 is thus positively connected to shaft 185 at all times to limit its rotation.

During the previously described reciprocation of the chart holder 36, two separate indicia groups are marked on the chart by the indicating assembly 33. It is not desirable to superimpose these indicia groups because of the loss of exact definition of the impressions, and for this reason we provide means to rotate or index the chart holder 36 between the times of engagement with the indicating assembly 33. The indicia groups are therefore circumferentially spaced with respect to each other and may be clearly distinguished.

The upper end of the chart holder stem 190 carries the indexing head 193 which engages an indexing gear 240 for rotation of the chart holder 36. The indexing gear 240 is made fast to drive shaft 185, rearwardly of the operating cam 184 as is seen in Fig. 5. The indexing head 193 is formed as a completely toothed bevel gear having angularly cut teeth 241. The indexing gear 240 carries only a partial segment or sector of gear teeth 242 adapted to engage with teeth 241 during a portion of its rotation. The supplementary portion of the periphery of gear 240 has a blank surface 243 which is slightly spaced from engagement with head 193 and overrides the same without imparting rotation.

Figure 16:
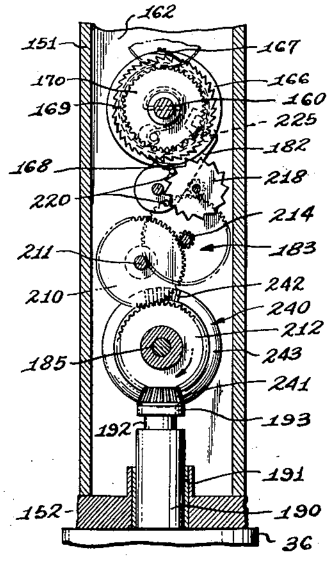
Figs. 16, 17 and 18 are partial sectional views taken in opposite direction to the views of Figs. 13, 14 and 15, respectively, showing the corresponding positions of the timing cam means and indexing gears.
Figure 17:
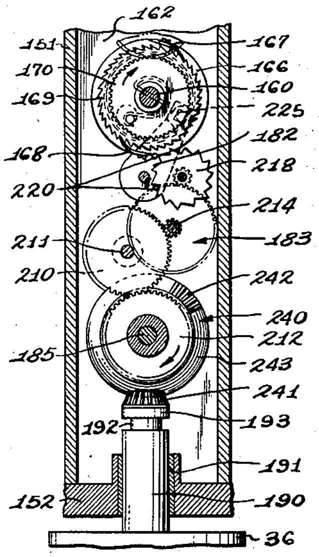
Figure 18:
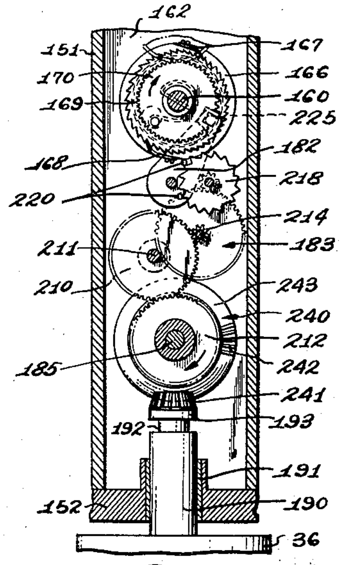

Approximately twice the number of teeth 241 are formed on indexing head 193 as the number of teeth 242 on gear 240. For this reason, the chart holder 36 is rotated through an angle of approximately 180° during the indexing operation. Figs. 16, 17 and 18 show the position of the indexing means corresponding, respectively, to the position in the operating cycle shown in Figs. 13, 14 and 15. Prior to the release of operating cam 184 for the first cycle of rotation, indexing gear 240 is in the position shown in Fig. 16. During this first cycle of operation, gear 240 rotates through a complete revolution and teeth 242 mesh with teeth 241 to index the stem 190 and chart holder 36. In Fig. 17 the first cycle of operation has been completed and gear 240 is rotated to the position in which teeth 242 have passed teeth 241 and are again spaced from them. The engagement of teeth 241—242 takes place near the end of each cycle, and in Fig. 18 the indexing is about to commence. Because the indexing occurs at the end of each cycle, the chart holder 36 is in the withdrawn position and is not engaged with the chart head 34 so as to upset the balance of the latter. After indexing, the chart 37 is rotated relative to head 34 and the succeeding engagement produces a second group of marks spaced from the first.

We are thus able to provide two separate indicia groups on the chart which will be spaced approximately in opposite directions from the center. After the instrument is withdrawn from the well bore, chart 37 is removed from chart holder 36 by unscrewing the retaining ring 127 and forcing the chart out of concave seat 125. The chart is then placed in a reading device as will later be described to determine the angular inclination from the vertical and the orientation in azimuth of the well bore. For such purposes, the indexing of the chart holder 36 is of substantial advantage since the indicia groups are spaced apart and may be clearly distinguished and measured. Furthermore, since there are two distinct indicia groups, it is clear that the instrument has, in fact, recorded twice.

Figures 11, 12:
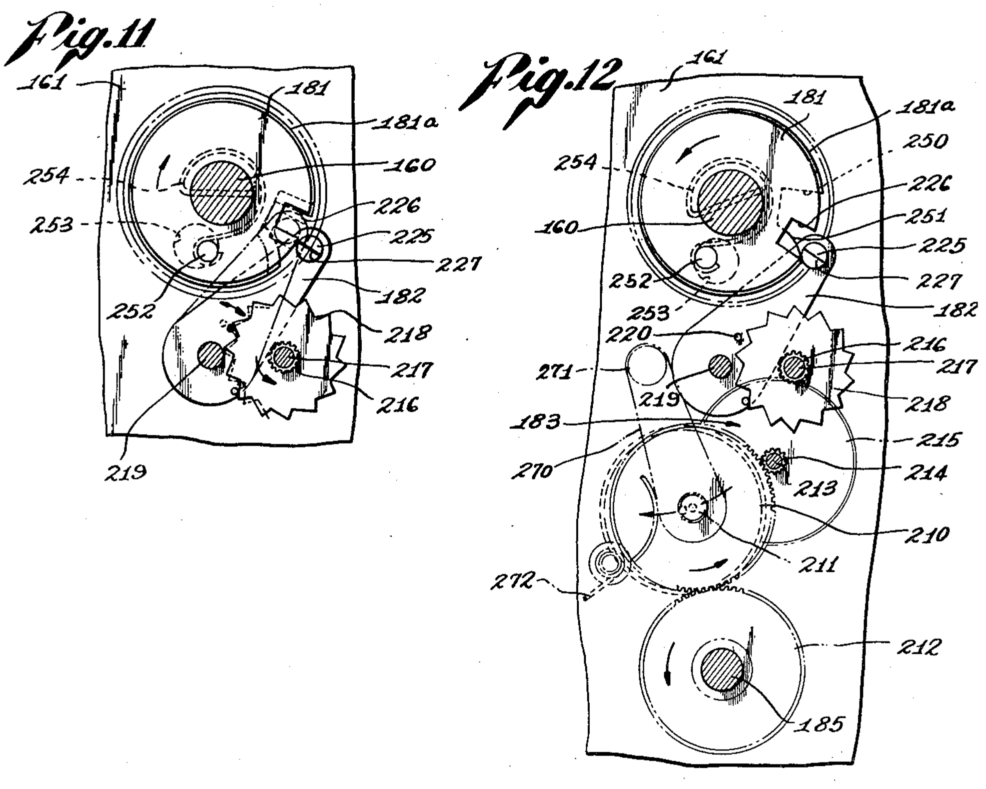
Fig. 11 is a detail of the timing cam and escapement lever.
Fig. 12 is a fragmentary section of the operating mechanism showing the details of the reset lever and gear connection.

Setting the instrument for operation is very simple and is accomplished by winding the upper timing knob 154 and lower operating knob 155. Prior to setting, timing cam 181 is in the zero position with escapement lever 182 free to oscillate back and forth as shown in Fig. 11. The cam follower 225 rides in and out of notch 226 with which it is aligned. Because of the free position of escapement lever 182 as just described, it is necessary to wind timing knob 154 before attempting to wind operating knob 155; that is, the control escapement 183 is in a free position and if operating shaft 185 is wound, the drive spring 186 will immediately drive operating means 180 back to the unwound position under the regulation of control escapement 183. The entire recording element 35 is, of course, removed from the housing 30 for setting purposes, and consequently there is no danger that chart holder 36 will engage indicating assembly 33 during the setting operation.

As was previously described, winding the timing knob 154 rotates shaft 160 and winds timing spring 164. The upper timing means 150 is then engaged through clutch 166 to regulate the rotation of shaft 160 back to the zero position and allow the elapse of the predetermined time interval. After the timing means 150 is set, the escapement lever 182 bears against the periphery of the timing cam 181 and is locked against oscillation. The control escapement 183 will then prevent forward or unwinding rotation of the operating drive shaft 185, and the operating knob 155 may be rotated to wind the drive spring 186.

When shaft 160 is rotated for setting, the timing cam 181 must be free to turn. It will be remembered that cam follower 225 has a plane surface 227 which aligns with the edge of cam notch 226 and may be seated therein. To rotate cam 181, the follower 225 must be lifted clear of notch 226 so that it may slide against the circular periphery of the cam. For this reason we form cam 181 with a rear cam plate 181a having a lifting surface which is moved into operative position with follower 225 during the resetting.

The front cam plate 181 carries the timing notch 226 while rear cam plate 181a is formed with an elongated notch 250 having an inclined lower edge or lifting surface 251 as is best seen in Fig. 12. The cam 181 is rotatably mounted on shaft 160 and is driven by cam 181a which is made fast to the shaft. A small drive pin 252 extends from the side of cam 181 and engages a larger circular opening 253 formed in cam 181a. The pin 252 is loose in opening 253 to permit a limited amount of relative rotation between cams 181 and 181a, but as the pin engages either side of the opening, the cams will continue to rotate together.

A coil spring 254 is wound around shaft 160 with the ends connected to cams 181 and 181a so as to urge pin 252 against the side of opening 253 as seen in Fig. 11. This is the normal or operating position of the cams and the notch 226 is aligned with the center of larger notch 250 so that there is no overlapping of the respective cam edges.

During the resetting operation, shaft 160 is rotated counterclockwise as seen in Fig. 12, and the cam plate 181a is likewise rotated. The cam plate 181 may be momentarily retarded by the cam follower surface 227 causing spring 254 to yield while pin 252 rides to the opposite side of circular opening 253. The inclined edge 251 of notch 250 then comes into an overlapping position with respect to cam notch 226 and bears against the cylindrical portion of cam follower 225, as is seen in Fig. 12.

As the cam follower 225 rides on inclined edge 251, it is cammed outwardly until it reaches the circular periphery of cam 181*a* against which it slides freely. The cam plate 181 is thus released from engagement with follower surface 227 and springs forwardly under the urging of spring 254 to resume the normal or operating position of Fig. 11. Both cam plates then continue to rotate together until the predetermined time interval is set into timing means 150.

The lowering operating knob 155 is then turned through two revolutions to wind spring 186 and bring operating cam 184 to the initial position. During each revolution of cam 184, the follower 198 must be lifted over cam fall 202 to continue riding on spiral surface 201. The plane surface 203 of follower 198 is not capable of riding up cam fall 202 and for this reason we provide cam 184 with an adjacent plate 184*a* similar to the construction of cam 181, 181*a*. As can best be seen in Figs. 9 and 10, the cam plate 184*a* is in front of cam 184 and has an inclined lifting surface 260 adjacent fall 202, while the remainder of the periphery conforms to spiral cam surface 201. The cam 184 is rotatable on shaft 185 and is driven by cam 184*a* which is made fast to the shaft. A small drive pin 262 extends from the side of cam 184 and engages a larger circular opening 263 in cam 184*a*. As the pin 262 engages either side of opening 263, cams 184 and 184*a* will rotate together.

A coil spring 264 engages cams 184 and 184*a* so as to urge pin 262 against the side of opening 263 as seen in Fig. 9. This is the normal or operating position of the cams, and the fall surface 202 overhangs inclined surface 260 so as to be in operative position with respect to the cam follower 198. During the resetting operation, shaft 185 is rotated clockwise, as seen in Fig. 10, and cam plate 184*a* is likewise rotated. The cam 184 is momentarily retarded by cam follower surface 203 abutting the fall 202, and spring 264 yields while pin 262 rides to the opposite side of opening 263. The lifting surface 261 comes into position adjacent the cylindrical portion of follower 198 and lifts the follower outwardly. As follower 198 reaches surface 201, the cam 184 is released and springs forwardly under the urging of spring 264 to resume the normal or operating position of Fig. 9. This action takes place during each revolution of shaft 185 until stop means 230 prevents further rotation.

During the winding of shaft 185 the control escapement 183 is locked by the engagement of escapement lever 182 and timing cam 181. Since lever 182 cannot move, the escapement gear train must be disconnected from shaft 185 to alloy rotation of the latter. We mount the escapement gear 210 for pivotal movement out of the path of pinion 214 upon winding or reverse rotation of shaft 185, so that this motion will not continue through control escapement 183.

As is best seen in Fig. 12, the shaft 185 carries gear 212 which drives gear 210. The gear 210 is mounted for rotation on shaft 211 which is supported by a crank 270. The crank 270 pivots about an upper pin 271 and swings gear 210 laterally into or out of engagement with the pinion 214. A spring clip 272 bears against the side of crank 270 and normally urges gear 210 into a position of engagement with pinion 214. During the winding of shaft 185 rotation takes place in a counterclockwise direction, as viewed in Fig. 12, and the engagement of gears 212 and 210 forces spring 272 to yield slightly so that gear 210 moves into the position shown in phantom outline, and out of engagement with pinion 214. Upon completion of the winding operation, the pressure against spring 272 is released and gear 210 moves back into engagement with pinion 214.

As has been previously described, the predetermined time interval has now started running, and the recording element 35 is secured within housing 30 and immediately lowered to position within the well bore. The double cycle of operation takes place upon the completion of the time interval to make the two separate indicia groups upon chart 37. When the instrument is withdrawn from the well, chart 37 is removed from chart holder 36 and is then used to calculate the inclination of the well bore from the vertical and the direction in azimuth.

Fig. 6 shows a chart reading device which is used to calculate the exact angle of inclination and the compass direction of orientation of the well bore from the readings made on the chart 37. A circular base 280 has an upper flange or ring 281 which defines a circular opening 282. At the center of base 280 is an upwardly extending sleeve 283 which rotatably supports a circular chart holder 284 by engagement with a lower stem 285. A clamping screw 286 is mounted in a recessed axial opening 287 cut into the base 280 and extends upwardly into the stem 285 for rotation therewith. The screw 286 supports a friction plate 288 which rides against the end wall of opening 287 to frictionally resist rotation of holder 284.

On the side of holder 284 is a knurled hand ring 289 which is used to rotate the holder relative to the base 280. The upper surface of holder 284 is dished to fit the curvature of the back side of chart 37, and the latter is seated firmly therein in the same position that it occupies in chart holder 36. The indicia group marked on chart 37 has been previously described as a series of dots or impressions lying in a straight line and normally comprising four points. It will also be remembered that two separate indicia groups will be spaced apart on chart 37 by reason of the double operating cycles of the instrument. In Fig. 6, one such indicia group is seen and the separate marks are designated by the numerals 120*a*, 121*a*, 122*a* corresponding, respectively, to the center marking pin 120, North pins 121 and South pin 122 of the indicating head 34. By rotation of chart holder 282, these marks of indicia group are rotated relative to the circular base member 280.

Seated into the upper edge of flange 281 is a rotatable compass dial 295 having degrees and the compass points marked thereon. The dial 295 has reversed markings to that of a conventional compass dial, because the chart 37 is held inverted above the indicating head 34 when the indicia group is recorded in the instrument. Readings taken from the dial 295 therefore indicate the corresponding positions of indicating head 34, which was the initial reference. The dial may be locked to the flange 281 by a set screw 296, and is rotatable for the purpose of setting in the deviation of the magnetic compass from the true North. As can be understood, this deviation is constant for a particular geographical area, and is preset into the reading device to give true directional readings.

Rotatably mounted within the base opening 282 is a removable ring 298 having a lower skirt 299 which slides against the inner periphery of the flange 281. The ring 298 encircles the chart holder 284, and supports a partial cylindrical wall 300 which extends upwardly beyond the chart holder. A side portion of the chart holder 284 is not closed in by the wall 300 and the knurled ring 289 is exposed for independent rotation of the chart holder. On the top of wall 300 is an annular rim 301 which supports a circular reading glass 302. The glass 302 is coaxial with the chart 37 and is spaced slightly above for free rotation with the ring 298. On the face of glass 302 is a plurality of parallel spaced hairlines 303 and a perpendicular angle or degree scale 304 which are brought into proper position with the indicia group on the face of chart 37.

A spring-pressed locking pin 310 extends radially through the flange 281 and is adapted to seat in an aperture 311 formed in the ring skirt 299. Directly above the aperture 311 is one end of a diametrically extending index line 312 which is marked on the face of the rotatable ring 298. The index line 312 is in parallel alignment with the hairlines 303 of the reading glass 302 and is used to establish a reference line indicating the magnetic North. The locking pin 310 drops into the aperture 311 to initially set the reference line 312 relative to the base 280 and compass dial 295.

Presetting of the compass dial 295 is accomplished by unlocking the set screw 296 and rotating the dial relative to the index line 312 which is held in exact parallel alignment with the radial axis of the pin 310. For example, if the deviation of the magnetic North Pole is 17° W. in the area, the ring 295 is rotated in the counterclockwise direction to bring the mark indicating N. 17° W. opposite the Northerly end of index line 312. The ring 295 is then locked in place by the set screw 296, and remains in this position during all operations in that locality.

After the chart 37 has been marked, it is placed in the holder 282 and the removable ring 298 is dropped into place within the opening 282. The ring 298 is rotated to engage the pin 310 with aperture 311 and thus align the index mark 312 in the direction of magnetic North relative to compass dial 295. As was previously mentioned, the hairlines 303 are parallel to the index line 312 and are therefore extending in the direction of magnetic North. The next step is to rotate the chart holder ring 289 until the indicia group on the chart 37 is parallel to the closest hairline 303. It will be remembered that the indicia group 120*a*—122*a* was impressed by the corresponding markers 120—122 on the indicating head 34, and that the head was maintained in the direction of magnetic North during the operation of the instrument.

This position of the chart 37 is seen in Fig. 7, in which the indicia group 120*a*—122*a* is aligned with the nearest hairline 303. Because of the closely spaced indicia marks 121*a*, it is possible to identify the North end of the indicia group, and these marks are, of course, aligned with the corresponding sections of the hairlines 303. The indicia group 120*a*—122*a* has now been brought into the proper orientation and the hairline 303 which extends diametrically across the reading glass 302 will correspond exactly to a reference line extending across the axis of the recording instrument when the indicia group was created.

Returning briefly to the construction of the indicating assembly 33, we find that the central marking pin 120 is exactly on the longitudinal axis of the assembly and would therefore be offset from the center of the chart 37 an angular amount which measures the inclination of the well bore from the vertical. It is also apparent that the direction in which the pin 120 is offset from the center of chart 37 will be the direction of deviation of the well bore. Since the position of Fig. 7 places the reading glass 302 in coaxial alignment with the chart 37, and oriented in the direction of magnetic North, the radial distance from the center of reading glass 302 to the mark 120*a* will be the angular inclination of the well bore. Likewise, the angle measured between the North reference line and a radius through the mark 120*a* will be the number of degrees which the well bore is offset from the North or the orientation in azimuth.

The hairlines 303 are equally spaced with the exception of a central pair 303*a* which just bracket the center. This construction creates a narrow transparent band between the hairlines 303*a* which lies on a diameter of the glass 302 and facilitates observation of the marks over which it passes. With chart 37 held stationary, the ring 298 is now rotated to bring the lines 303*a* in a bracketing position with respect to the mark 120*a*, as is seen in Fig. 8. The index line 312 will now point to the mark on the dial 295 which will be the reading in azimuth. In the example shown, the index 312 reads S. 75° W. which will be the true azimuth of the well bore.

Measurement of the angle of inclination is accomplished by measuring the number of degrees that the mark 120 is offset from the center of glass 302. This is done with the scale 304 which is calibrated in units of degrees. In the example shown, if the entire scale 304 covers 20°, the inclination of the well bore will be approximately 9°. In Figs. 7 and 8 a separate indicia group 120*b*, 121*b* and 122*b* is shown. This group will be the marks resulting from the second cycle of engagement between chart 37 and the indicating head 34. Exactly the same procedure is followed to determine the measurement of the indicia group 120*b*—122*b*, and the description need not be repeated herein. It can be understood that if the instrument was operating properly, the readings will be the same, and if they are not, some error was made. If an error appears, the readings are discarded and a re-run of the instrument is made.

Notwithstanding the foregoing detailed description, the operation of the chart reading device is relatively simple, and the operating personnel need not understand the underlying theory. Likewise, the chart 37 is a permanent record and may be preserved for measurement at a future time by other persons. The amount of time needed to complete the measurements after the recording instrument has been withdrawn from the well is very short, and none of the complex equipment used for developing photographic films or the like is needed. Since the indicia group was made by the direct engagement of the chart and indicating assembly, there are no errors of parallax or distortion as might be present with the use of photographic recording means.

Figures 19, 20, 21, 22, 23:
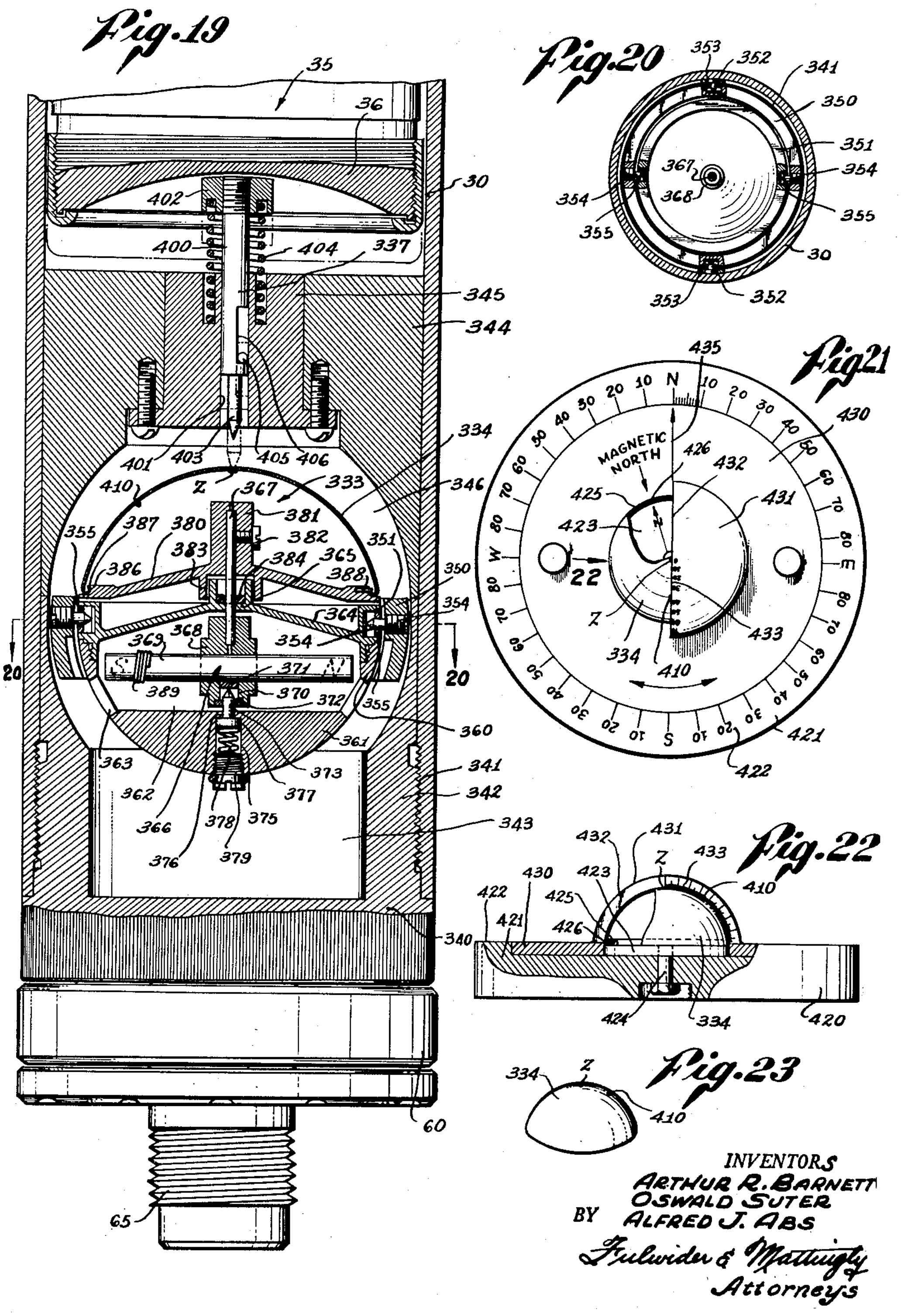
Fig. 19 is an enlarged sectional view of a modified form of indicating assembly.
Fig. 20 is a section taken along the line 20—20 of Fig. 19.
Fig. 21 is a plan view of a modified form of chart reading device.
Fig. 22 is a side elevation, partially in section, taken in the direction of the arrow 22 of Fig. 21.
Fig. 23 is a perspective view of the hemispherical chart used with the modified indicating assembly.

Fig. 19 shows a modified form of indicating assembly 333 which is designed to indicate higher angles of inclination than can be assumed by the previously described indicating assembly 33. At the same time, the assembly 333 indicates the azimuthal direction of the well bore in a manner similar to that previously described. The assembly 333 is adapted to fit within the instrument housing 30 in place of the assembly 33, and cooperate with the previously described recording element 35 in a somewhat different manner.

The assembly 333 supports a hemispherical chart 334 for pivotal and rotational movement relative to the housing 30 as the latter is inclined in accordance with the direction of the well bore. The chart 334 is maintained in an upstanding position by pendulum means, and is rotated in response to the orientation of a compass means. Therefore, the zenith of the chart 334 is offset from the longitudinal axis of housing 30 an angular amount equal to the inclination of the well bore, and is oriented in the azimuth direction thereof. Mounted for sliding movement on the axis of housing 30 is a marking means 337 which moves into and out of engagement with the chart 334. Because the marking means 337 lies on the axis of housing 30, the impression made on the surface of chart 334 can be measured relative to the chart zenith to determine the offset of the zenith from the housing axis.

The marking means 337 is actuated by recording element 35 and is moved by the sliding movement of chart holder 36. In this use of the recording element 35, the chart holder 36 acts only as a plunger to drive the marking means 337, and the previously described chart 37 is not seated therein. For clarity, the chart holder 36 will be hereinafter referred to as a plunger, and it is understood that its shape may be modified as desired. The successive operating cycles of the recording element 35 will cause the marking means 337 to engage twice with the chart 334 and the resulting impression will be superimposed unless the chart was oscillating during the operating interval. Thus, as is in the preferred form, we are able to make a positive check on the accuracy of the instrument. However, the chart readings or marks will not be spaced apart as in the preferred form of the instrument since the relative positions of the chart 334 and marking means 337 will not be changed by indexing the plunger 36.

Closing the bottom of the housing 30 is a base member 340 which may be fitted with a flange 60 and connecting studs 65 as in the preferred form of the instrument. The base 340 is joined to a sleeve 341 which fits within the housing 30 and has a threaded exterior section 342 to engage with housing threads 41. The sleeve 341 defines an open cylindrical member 343 which provides freedom of movement for the pendulum swinging of the indicating assembly 333. Above the sleeve 341 is a sleeve 344 having an inwardly flanged top portion which is completely closed by plug 345. The marking means 337 are supported by the plug 345 which is detachable from the sleeve 344. The lower wall of sleeve 344 is recessed outwardly to provide in conjunction with a complementary recessed portion in the neck of sleeve 341 a generally spherical chamber 346.

The indicating assembly 333 is mounted within the chamber 346 and is supported for universal movement by outer and inner concentric gimbal rings 350 and 351. The outer gimbal ring 350 is supported from the sleeve 341 by a pair of opposed pivots 352 as is best seen in Fig. 20. Each pivot 352 is formed as a short pin projecting from the sleeve 341 to seat rotatably in an annular jewel bearing 353 recessed within the ring 350. The inner gimbal ring 351 is in turn supported from the ring 350 by opposed pivots 354 which lie on a transverse axis perpendicular to the axis of pivot 352. The pivots 354 are rotatably seated in bearings 355 carried by the ring 351 so that the latter may pivot in any direction relative to the housing 30.

In order to maintain the indicating assembly 333 and chart 334 in an upstanding position, the ring 351 is engaged with a lower hemispherical shell 360 which supports a weighted pendulum block 361. Above the pendulum block 361 is an inner chamber 362 which is vented to the air surrounding the indicating assembly 333 by means of apertures 363 cut into the shell 360. The chamber 362 is partially closed at its upper end by a web or spider 364 which extends across the ring 361 and has a centrally raised flange to provide a bearing seat 365 lying on the longitudinal axis of the indicating assembly. Rotatably mounted within the chamber 362 is a magnetic compass element 366 having a shaft 367 extending upwardly through the bearing seat 365 and connected to the chart 334. The shaft 367 rotates the chart 334 in azimuth to the direction assumed by the compass element 366.

The compass element 366 comprises a central rectangular holder 368 carrying a horizontal bar magnet 369. In the bottom of holder 368 is a bore 370 having a hardened upper seat 371 and an annular jewel bearing 372. A pivot pin 373 projects upwardly from the pendulum block 361 and engages the seat 371 to rotatably support the holder 368. The bearing 372 surrounds the pivot 373 to prevent lateral movement and makes only a slight surface contact which is substantially frictionless. As can be understood, either this form of bearing or that shown in the preferred form may be used interchangeably, as desired. The pin 373 is resiliently mounted within the block 361 to prevent damage of the seat 371 should the housing 30 receive an excessive shock or impact. A longitudinal bore 375 is cut through the block 361 and is partially closed by a flanged upper rim 376. The pin 373 has an enlarged head 377 which is slidable within the bore 375 and is urged upwardly by a spring 378 to seat against the rim 376. A threaded adjustment screw 379 engages the lower end of bore 375 to confine the spring 378.

In order that the available magnetic torque of the compass element 366 need not be utilized in rotating the entire indicating assembly 333, the chart 334 is supported by a rotatable head 380. The head 380 is formed as a circular disk which is spaced slightly above the ring 351 and has a central hub 381 which engages the compass shaft 367. The compass shaft 367 is axially adjustable within the hub 381 by means of a set screw 382 so that the spacing of the head 380 from the ring 351 may be varied. Extending downwardly from the head 380 is a skirt 383 which overlaps the bearing seat 365 and is normally spaced slightly therefrom. An annular jewel bearing 384 is fitted within the seat 365 to provide a substantially frictionless support for the compass shaft 367. If the shaft 367 is deflected slightly, the skirt 383 will momentarily engage the seat 365 to prevent excessive strain on the delicate bearings 384. On the outer edge of the head 380 is a circular lip 386 which is adapted to engage tightly with a rolled edge 387 formed on the chart 334. At a position on the lip 386 directly above the North-seeking end of the bar magnet 369 a small index pin 388 extends outwardly and is adapted to engage with an index aperture formed in the rolled edge 387. The pin 388 thus serves to establish a reference point on the chart 334 which is always oriented in azimuth to the direction of magnetic North, and this point is used in aligning the chart within the reading device as will later be described. The zenith point of the chart 334 will be maintained in the true vertical by the action of the pendulum 361 and will accordingly be offset from the axis of the housing 30 which is inclined along the direction of the well bore.

As was similarly described in connection with the preferred form of the instrument, it is advantageous that the compass element 366 be mounted within the indicating assembly 333 since the bar magnet 369 will always be maintained in the true horizontal plane irrespective of the inclination of the well bore. A small counterweight 389 is adjustably fitted around the South-seeking end of the magnet 369 to compensate for the local dip of the magnetic flux line. The magnet 369 therefore exerts no inclining force on the indicating assembly 333 which stands in the true vertical under the gravitational pull on the pendulum block 361. Accordingly the magnetic torque will be uniform and will not vary with inclination of a particular well bore.

The marking means 337 includes a piston 400 which is slidably mounted within an axial bore 401 formed in the plug 345. On the top of piston 400 is a bumper cap 402 which is spaced slightly from plunger 36 when the latter is in the withdrawn position. On the lower end of piston 400 is a marker pin 403 which presses into the material of the chart 334 upon downward movement of the piston. A coil spring 404 surrounds the piston 400 and is confined between the plug 345 and bumper 402 to urge the piston upwardly. As the plunger 36 moves downwardly in the operating cycle, it engages bumper 402 and drives the piston 400 downwardly causing spring 404 to yield. The pin 403 is driven into engagement with chart 334 during the last part of the plunger stroke and a permanent record is made. When the plunger 36 is retracted upwardly, the piston 400 returns to the initial position under the urging of spring 404. To limit the travel of the piston 400, a stop pin 405 is secured in the plug 345 and rides within elongated slot 406 cut into the side of the piston.

The marks made into the surface of chart 334 may, of course, be at any location depending upon the inclination and direction of the well bore. A mark "Z" is shown at the zenith point of the chart 334 as would indicate a vertical well bore. This condition will not normally be obtained, and the mark "Z" is illustrative only. A similar mark 410 is shown offset from the zenith to indicate an inclined well bore as will be the normal condition. It will be remembered from the previous description of the recording element 35, that two cycles of operation occur as the plunger 36 is reciprocated twice. Thus, there will be a double engagement of the marking pin 403 and chart 334, which should result in superimposed marks 410 if the instrument is recording properly. We are able therefore to provide a positive check on the accuracy of the instrument, as was accomplished with the preferred form. If the marks 410 are not superimposed, some error has occurred and a re-run of the instrument is made.

After the instrument is withdrawn from the well bore, the chart 334 is removed from the head 380 and is placed in a chart reading device shown in Figs. 21 and 22. A circular base 420 has an upper flange or rim 421 which defines a flat circular recess. On the upper surface of flange 421 is a compass dial 422 having degrees and compass points marked thereon as may best be seen in Fig. 21. Seated within the base 420 is a rotatable disk 423 which is similar to the head 380 and is adapted to support the chart 334. The disk 423 is coaxial with the base 420 and may be locked against rotation by a threaded stem 424 which projects downwardly through the base. On the upper rim of the disk 423 is a recessed lip 425 corresponding to the lip 386 which engages the knurled edge 387 of the chart 334. An index pin 426 corresponds to the index pin 388 and engages the aforementioned aperture of the chart 334 to establish a reference point lying along the axis of magnetic North. The disk 423 is rotated to bring the index pin 426 in radial alignment with the magnetic North as indicated on the compass dial 422. For example, if the magnetic deviation is 20° W., the pin 426 is aligned with the compass scale N. 20° W. as seen in Fig. 21. The chart 334 is thus oriented with respect to the compass dial 422 in the same relative position that it occupied within the recording instrument.

A removable annular ring 430 is rotatably seated in the base 420 between the disk 423 and rim 421. The ring 430 supports a shell 431 which overlies one-half of chart 334 to provide a measuring scale adjacent the surface of the chart. The shell 431 is in the form of a 90° hollow spherical wedge and has a semi-annular vertical face 432 on which is engraved an angle scale 433. The scale 433 extends around a 90° arc as may be best seen in Fig. 22, and is calibrated in units of angular measure. The zero point of scale 433 is coaxial with the zenith point "Z" of chart 334 and the scale numbers increase down the face 432. In operation, the ring 430 is rotated in the horizontal plane to bring the surface of the scale 433 in vertical alignment with the recorded mark 410 on the chart surface.

The angular displacement of mark 410 from the zenith "Z" is then measured on the scale 433. As is best seen in Fig. 21, for the example chosen, the angular distance is approximately 36°. This angle measures the inclination of the well bore from the vertical as it is a measure of the displacement of the marking means 337 from the zenith of the chart 334. To measure the direction in which the well bore is inclined from the vertical, an index line 435 is marked on the face of the ring 430 in alignment with hte vertical shell face 432. When the scale 433 is in vertical alignment with the mark 410, the opposed end of the index line 435 will register with the graduation on the compass dial 422 indicating the direction in azimuth of the well bore. In the example, the well bore is inclined in the direction of true North, and index line 435 is aligned with the North compass point.

Many of the recording advantages of the preferred form are also provided in this form of the recording apparatus. The chart 334 is a permanent record and may be rechecked as necessary in the future. Likewise, the chart reading device is simple to operate and may be used by non-technical personnel. As aforementioned, the modified form of indicating assembly is capable of indicating angles in a much higher range than the preferred form, and has a wide operational use.

We have described in detail preferred and modified forms of recording instrument and reading device which are fully capable of providing the aforementioned objects and advantages. It is to be understood, however, that many changes in design will be apparent to those skilled in the art and we do not wish to be limited, except as defined in the appended claims.

We claim:

1. An instrument for surveying well bores which includes: an elongated housing; pendulum means mechanically suspended in said housing; compass means rotatably mounted within said pendulum means; marking means mounted in said pendulum means and rotatable with said compass means; a plunger mounted for reciprocating movement within said housing and normally spaced from said pendulum means; a deformable chart adapted to engage said marking means upon movement of said plunger, said chart and marking means being universally movable relative to each other; operating means for reciprocating said plunger through cycles of engagement and withdrawal from said pendulum means to record indicia indicating the relative inclination between said housing and said pendulum means and the orientation in azimuth of said compass means; a control escapement connected to said operating means to regulate the operating cycles of said operating means; and timing means operatively associated with said control escapement and preventing the release thereof until the lapse of a predetermined time.

2. Apparatus for surveying well bores which comprises a recording instrument and a chart reading device, said instrument having pendulum means and compass means inclinably and rotatably mounted together in a single assembly and connected with marking means to record on a separately supported removable chart a plurality of marks, said marks being aligned in a predetermined azithmuthal direction by said compass means and one of said marks being offset from the center of said chart by the action of said pendulum means on said marking means an amount proportional to the inclination of the marking means from the longitudinal axis of the instrument, said reading device having a central rotatable holder to receive said chart and an outer compass dial with an index mark at said predetermined direction, said holder being rotatable to orient said chart marks parallel to a radial axis through said index mark, one of said chart marks lying on the longitudinal axis of said pendulum means, and said reading device being formed with an upper rotatable glass having a diametral index line, parallel spaced index lines, and an angle scale perpendicular to said diametral index, said glass being rotatable to bring diametral index over said chart axial mark whereby to determine the inclination of a well bore on said angle scale, and the direction in azimuth of said well bore by the position of said diametral index against said compass dial.

3. An instrument for surveying well bores which includes: an elongated housing; pendulum means mechanically suspended in said housing; compass means rotatably carried by said pendulum means; marking means mounted in said pendulum means for rotation with said compass means and responsive to movement thereof; a chart holder mounted for reciprocating movement within said housing and normally spaced from said marking means; operating means for reciprocating said chart holder through cycles of engagement and withdrawal from said marking means to record indicia indicating the relative inclination between said housing and said pendulum means and the orientation in azimuth of said compass means; and timing means operatively associated with said operating means and controlling the time of operation thereof.

4. An instrument for surveying well bores which includes: an elongated housing; pendulum means mechanically suspended in said housing for free pivotal movement; compass means rotatably carried by said pendulum means; an indicating head having a plurality of marking elements thereon, said head being mounted in said pendulum means for rotation with said compass means; a chart holder mounted for reciprocating movement within said housing and normally spaced from said marking head; operating means for reciprocating said chart holder through cycles of engagement and withdrawal from said marking head to record indicia groups indicating the relative inclination between said housing and said pendulum means, and the orientation in azimuth of said compass means; a control escapement connected to said operating means to regulate the operating cycles of said operating means; and timing means engaged with said control escapement and preventing the release thereof until the lapse of a predetermined time.

5. An instrument for surveying well bores which includes: an elongated housing; pendulum means mechanically suspended in said housing; compass means rotatably mounted within said pendulum means; marking means mounted in said pendulum means and rotatable with said compass means; a chart holder mounted for reciprocating and rotational movement on the axis of said housing and normally spaced from said marking means; operating means for reciprocating said chart holder through cycles of engagement and withdrawal from said marking means to record indicia groups indicating the relative inclination between said housing and said pendulum means and the orientation in azimuth of said compass means; a control escapement connected to said operating means to regulate the operating cycles of said operating means; indexing means engageable with said chart holder for rotation thereof during the cycles of reciprocation to space apart said indicia groups; and timing means engaged with said control escapement and preventing the release thereof until the lapse of a predetermined time.

6. An instrument for surveying well bores which includes: an elongated housing; pendulum means suspended on the axis of said housing for universal movement; compass means rotatably mounted within said pendulum means; marking means operatively associated with said pendulum means and said compass means and responsive to movement thereof; a chart holder mounted for sliding and rotational movement on the axis of said housing and normally spaced from said marking means; operating means for reciprocating said chart holder through cycles of engagement and withdrawal from said marking means to record indicia groups indicating the relative inclination between said housing and said pendulum means and the orientation in azimuth of said compass means, said operating means having a spring-urged rotatable cam and a separate spring-urged crank riding thereon and connected to said chart holder to drive said chart holder into engagement with said marking means; and timing means operatively associated with said operating means and preventing the release thereof until the lapse of a predetermined time.

7. An instrument for surveying well bores which includes: an elongated housing; pendulum means suspended on the axis of said housing for universal movement; compass means rotatably mounted within said pendulum means; an indicating head having a plurality of marking elements thereon, said head being mounted in said pendulum means for rotation with said compass means; a chart holder mounted for reciprocating and rotational movement on the axis of said housing and normally spaced from said indicating head; operating means for reciprocating said chart holder through cycles of engagement and withdrawal from said indicating head to record indicia groups indicating the relative inclination between said housing and said pendulum means and the orientation in azimuth of said compass means, said operating means having a spring-urged rotatable cam and a separate spring-urged crank riding thereon and connected with said chart holder for driving said holder into engagement with said indicating head; a control escapement connected to said operating means to regulate the operating cycles of said operating means; indexing means engageable with said chart holder for rotation thereof during the cycles of reciprocation to space apart said indicia groups; and timing means engaged with said control escapement and preventing the release thereof until the lapse of a predetermined time.

8. An instrument for surveying well bores which includes: an elongated housing; pendulum means suspended on the axis of said housing for universal movement; compass means rotatably mounted within said pendulum means; an indicating head having a plurality of marking pins thereon, one of said pins being on the longitudinal axis of said pendulum means and another of said pins being displaced from said first pin on an axis parallel to said compass means, said head being mounted on said pendulum means for rotation with said compass means; a chart holder mounted for sliding and rotational movement on the axis of said housing and normally spaced from said marking head; operating means for reciprocating said chart holder through cycles of engagement and withdrawal from said marking head to record indicia groups indicating the relative inclination between said housing and said pendulum means and the orientation in azimuth of said compass means, said operating means having a spring-urged rotatable cam adapted for multiple revolution and a pivotal spring-urged crank riding thereon and connected with said chart holder for driving said holder into engagement with said marking head, said crank being reversely pivoted by said cam to withdraw said holder during each revolution of said cam; a control escapement connected to said operating means to regulate the operating cycles of said operating means; and timing means engaged with said control escapement and preventing the release thereof until the lapse of a predetermined time.

9. An instrument for surveying well bores which includes: an elongated housing; pendulum means suspended on the axis of said housing for universal movement; compass means rotatably mounted within said pendulum means; an indicating head having a plurality of marking pins thereon, said head being mounted in said pendulum means for rotation with said compass means; a framework removably mounted within said housing and spaced from said indicating head; a circular chart holder slidably supported in said framework for movement along the axis of said housing into and out of engagement with said indicating head; a drive shaft rotatably mounted in said framework and extending laterally across said housing; spring means urging multiple revolution of said shaft; a control escapement lever pivotally mounted on said framework; gear means connecting said escapement lever with said drive shaft to regulate the rotation of said shaft according to the oscillating period of said escapement; a single lobe cam fixed on said shaft and having an abrupt fall and a gradual lift surface; a bell crank pivotally mounted on said framework, said crank having a cam follower riding on said cam and an arm connected to said chart holder to move said holder axially, said crank being adapted to move said holder away from said framework upon engagement with said cam fall; spring means urging said bell crank to pivot in a direction to drive said holder outwardly; and timing means engaged with said escapement lever and preventing movement thereof until the lapse of a predetermined time, then releasing said lever whereby said drive shaft and said cam rotate through multiple revolutions, releasing said bell crank for downward pivotal movement to drive said chart holder into engagement with said marking means and lifting said bell crank to withdraw said chart holder from said marking means during each of said revolutions.

10. An instrument for surveying well bores which includes: an elongated tubular housing; pendulum means suspended on the axis of said housing for universal movement; compass means rotatably mounted within said pendulum means; an indicating head having a plurality of marking pins thereon, one of said pins being on the longitudinal axis of said pendulum means and another of said pins being displaced from said first pin on an axis parallel to said compass means, said head being mounted on said pendulum means for rotation with said compass means; a framework removably mounted within said housing and spaced from said indicating head; a circular chart holder slidably supported in said framework for movement on the axis of said housing into and out of engagement with said indicating head; a drive shaft rotatably mounted in said framework and extending laterally across said housing; spring means urging multiple revolution of said shaft; a control escapement lever pivotally mounted on said framework; gear means connecting said escapement lever with said drive shaft to regulate the rotation of said shaft according to the oscillating period of said escapement; a single lobe cam fixed on said shaft and having an abrupt fall and a gradual lift surface; a bell crank pivotally mounted on said framework, said crank having a cam follower riding on said cam and an arm connected to said chart holder to move said holder axially, said crank being adapted to move said holder away from said framework upon engagement with said cam fall; spring means urging said bell crank to pivot in a direction to drive said holder outwardly; timing means engaged with said escapement lever and preventing movement thereof until the lapse of a predetermined time, then releasing said lever whereby said drive shaft and said cam rotate through multiple revolutions, releasing said bell crank for downward pivotal movement to drive said chart holder into engagement with said marking means and lifting said bell crank to withdraw said chart holder from said marking means during each of said revolutions; and indexing means engageable with said chart holder in the withdrawn position and rotatable with said drive shaft to rotate said chart holder about the axis of said housing between successive engagements with said indicating head whereby to space apart the engagements of said head and said holder.

11. An instrument for surveying well bores which includes: an elongated tubular housing; pendulum means suspended on the axis of said housing; compass means rotatably mounted within said pendulum means; an indicating head having a plurality of marking pins thereon, one of said pins being on the longitudinal axis of said pendulum means and another of said pins being displaced from said first pin on an axis parallel to said compass means, said head being mounted on said pendulum means for rotation with said compass means; a cylindrical framework removably mounted in said housing and centered axially therein; a circular chart holder slidably supported in said framework for movement on the axis of said housing into and out of engagement with said indicating head, said holder having a stem within said framework having a cylindrical drive groove and a bevel gear on the end thereof; a drive shaft rotatably mounted in said framework and extending laterally across said housing; spring means urging multiple revolution of said shaft; a control escapement lever pivotally mounted on said framework; gear means connecting said escapement lever with said drive shaft to regulate the rotation of said shaft according to the oscillating period of said escapement, a single lobe cam fixed on said shaft and having an abrupt fall and a gradual lift surface; a bell crank pivotally mounted on said framework, said crank having a cam follower riding on said cam and a lower arm carrying a drive pin rotatably engaged in said chart holder groove to move said holder axially, said crank being adapted to move said holder away from said framework upon engagement with said cam fall; spring means urging said bell crank to pivot in a direction to drive said holder outwardly; timing means engaged with said escapement lever and preventing movement thereof until the lapse of a predetermined time, then releasing said lever whereby said drive shaft and said cam rotate through multiple revolutions, releasing said bell crank for downward pivotal movement to drive said chart holder into engagement with said marking means and lifting said bell crank to withdraw said chart holder from said marking means during each of said revolutions; and indexing means including a partial bevel gear engageable with said chart holder gear when said holder is in the withdrawn position, said indexing means being rotatable with said drive shaft to rotate said chart holder about the axis of said housing between successive engagements with said indicating head whereby to space apart the engagement of said head and said holder.

12. An instrument for surveying well bores which includes: an elongated housing; a pivot stem mounted in said housing and extending upwardly along the axis thereof, said stem having an upwardly projecting pivot pin and a lower spherical head centered on the point of said pin; a pendulum element seated on said pivot pin by a central bearing, said element having a complement socket loosely surrounding said stem head and a dependent weighted skirt overhanging said stem, said element having a body above said pivot pin formed with an inner chamber open at the bottom by vent ports and at the top by a central neck; a magnetic compass element rotatably mounted within said body chamber and having an upwardly extending shaft; annular bearing means mounted in said body neck to rotatably support said shaft; an indicating head connected to the top of said shaft and carrying a plurality of marking pins, one of said pins being on the longitudinal axis of said pendulum element and another of said pins being spaced from said first pin on an axis parallel with said compass element, said head being spaced above said body neck and having a dependent flange overhanging said neck to provide an upper chamber above said bearing means, said chamber venting outwardly through the annular passageway between said neck and said flange, the area of said passageway having the same ratio to the volume of said upper chamber as the area of said vent ports has to the volume of said body chamber whereby to maintain a balanced pressure in said chamber; a chart holder mounted for sliding and rotational movement along the axis of said housing and normally spaced from said indicating head; operating means for reciprocating said chart holder through cycles of engagement and withdrawal from said indicating head to record indicia groups indicating the relative inclination between said housing and said pendulum element and the orientation in azimuth of said compass element; a control escapement connected to said operating means to regulate the operating cycles of said operating means; indexing means engageable with said chart holder for rotation thereof during the cycles of reciprocation to space apart said indicia groups; and timing means engaged with said control escapement and preventing the release thereof until the lapse of a predetermined time.

13. A reading device for interpreting a chart indicating the inclination and direction of a well bore, said device comprising: a circular base having a central recess; a chart holder rotatably supported within the center of said recess, and adapted to receive a chart having a plurality of marks extending along a magnetic North axis, one of said marks being radially offset from the center of said chart a distance proportional to the angular inclination of said well bore; a radial spring-urged index pin; a compass dial rotatably mounted on the rim of said base, said dial being secured relative to said index pin whereby the latter lies on the magnetic North axis of said dial; a rotatable annular ring mounted in said recess to surround said chart holder, said ring having a partial wall extending above said chart; and an index glass supported by said ring wall in coaxial alignment with said chart, said glass having a diametral index line, a set of parallel spaced index lines, and an angular scale extending perpendicular to said diametral index, said chart holder being rotatable to align said chart marks with one of said index lines, and said glass being rotatable to superimpose said scale over said radially offset chart mark, whereby to measure the angular inclination of said well bore on said scale, and the direction in azimuth of said well bore by the reading of said diametral index on said compass dial.

14. An instrument for surveying well bores which includes: an elongated housing; pendulum means suspended in said housing; marking means operatively associated with said pendulum means and responsive to movement thereof; a plunger mounted for reciprocating movement within said housing and normally spaced from said pendulum means; operating means for reciprocating said plunger through successive cycles of engagement and withdrawal from said pendulum means to record indicia indicating the relative inclination between said housing and said pendulum means, said operating means having a drive spring adapted to be tensioned for storing energy therein and released for actuating said operating means continuously through said successive cycles; a control escapement connected to said operating means for retarding the release of energy from said drive spring to regulate the timing of the successive cycles of said operating means; and timing means associated with said control escapement and preventing the release of said operating means until the lapse of a predetermined time.

15. In an instrument for surveying well bores having indicating means and chart means for recording the position of said indicating means: operating means movable through successive cycles of operation to record on said chart means the position of said indicating means, said operating means having a drive spring adapted to be tensioned for storing energy therein and released for actuating said operating means continuously through said successive cycles; a control escapement connected to said operating means for retarding the release of energy from said drive spring, said escapement having a pivotally mounted lever and gear means connecting said lever with said operating means to regulate the release of energy from said drive spring according to the oscillating period of said escapement lever; and timing means connected with said control escapement and having a time controlled member engaged with said escapement lever and preventing the release of said operating means until the lapse of a predetermined time.

References Cited in the file of this patent

UNITED STATES PATENTS

| | | |
|---|---|---|
| 837,415 | Marriott | Dec. 4, 1906 |
| 1,376,727 | Pentz | May 3, 1921 |
| 1,448,031 | Morris | Mar. 13, 1923 |
| 1,910,720 | Tarlton | May 23, 1933 |
| 1,981,665 | Rieber | Nov. 20, 1934 |
| 2,089,153 | Monroe | Aug. 3, 1937 |
| 2,109,690 | Culbertson | Mar. 1, 1938 |
| 2,129,395 | Anderson | Sept. 6, 1938 |
| 2,140,914 | Kothny | Dec. 20, 1938 |
| 2,167,071 | Hendrickson | July 25, 1939 |
| 2,189,560 | Culbertson | Feb. 6, 1940 |
| 2,205,022 | Tipter | June 18, 1940 |
| 2,205,729 | Monroe | June 25, 1940 |
| 2,240,417 | Ring | Apr. 29, 1941 |
| 2,327,659 | Miller | Aug. 24, 1943 |
| 2,334,429 | Miller | Nov. 16, 1943 |
| 2,334,950 | Opocensky | Nov. 23, 1943 |
| 2,357,131 | Putnam | Aug. 29, 1944 |
| 2,413,005 | Smith | Dec. 24, 1946 |
| 2,624,952 | MacLagan | Jan. 13, 1953 |
| 2,653,389 | Butterworth et al. | Sept. 29, 1953 |